United States Patent [19]

Watanabe et al.

[11] Patent Number: 5,464,673
[45] Date of Patent: Nov. 7, 1995

[54] INFORMATION RECORDING MEDIUM HAVING RECORDING LAYER WITH ORGANIC POLYMER AND DYE CONTAINED THEREIN

[75] Inventors: Itsuo Watanabe, Shimodate; Atsushi Kuwano, Tsukuba; Jun Taketatsu, Tsukuba; Nobuaki Takane, Tsukuba; Mitsuo Yamada, Shimodate; Seiji Tai, Hitachi, all of Japan

[73] Assignee: Hitachi Chemical Co., Ltd., Tokyo, Japan

[21] Appl. No.: 926,108

[22] Filed: Aug. 5, 1992

[30] Foreign Application Priority Data

| Aug. 8, 1991 | [JP] | Japan | 3-198174 |
|---|---|---|---|
| Aug. 8, 1991 | [JP] | Japan | 3-198175 |
| Dec. 26, 1991 | [JP] | Japan | 3-345072 |
| Feb. 26, 1992 | [JP] | Japan | 4-038283 |
| Apr. 17, 1992 | [JP] | Japan | 4-096929 |
| Apr. 23, 1992 | [JP] | Japan | 4-103402 |

[51] Int. Cl.$^6$ ............................. B32B 3/00; G11B 7/24
[52] U.S. Cl. .................. 428/65.1; 428/65; 428/411.1; 428/462; 428/521; 428/913; 430/945; 346/135.1; 369/275.2
[58] Field of Search ................... 428/64, 65, 913, 428/411.1, 462, 521; 430/945; 369/275.2, 284; 346/76 L, 135.1

[56] References Cited

U.S. PATENT DOCUMENTS

| 4,513,071 | 4/1985 | Mey | 430/19 |
|---|---|---|---|
| 4,725,525 | 2/1988 | Kenney et al. | 430/270 |
| 4,788,562 | 11/1988 | Barzynski | 346/135.1 |
| 4,837,063 | 6/1989 | Irie | 428/64 |
| 4,943,681 | 7/1990 | Sato et al. | 430/495 |
| 4,968,593 | 11/1990 | Inagaki et al. | 430/495 |
| 5,009,987 | 4/1991 | Mihara et al. | 430/495 |
| 5,019,476 | 5/1991 | Kanno et al. | 430/20 |
| 5,075,147 | 12/1991 | Usami et al. | 428/64 |
| 5,186,995 | 2/1993 | Yoshizawa et al. | 428/64 |
| 5,215,800 | 6/1993 | Daido et al. | 428/64 |

FOREIGN PATENT DOCUMENTS

| 0230240 | 1/1987 | European Pat. Off. . |
|---|---|---|
| 0379276 | 1/1990 | European Pat. Off. . |
| 3641787 | 6/1988 | Germany . |
| 56147124 | 3/1983 | Japan . |
| 56145730 | 3/1983 | Japan . |
| 56146613 | 3/1983 | Japan . |
| 2-139284(A) | 5/1990 | Japan . |
| 2-202482(A) | 8/1990 | Japan . |
| 2-196689(A) | 8/1990 | Japan . |

OTHER PUBLICATIONS

English translation of DE 364,787 (Naegele et al.).
Chemical Abstracts, vol. 112, No. 4, Jan. 22, 1990, Katsumi Yoshino et al. "Photosensitive element containing five–membered heterocycle–containing polymer." p. 506, col. 2.
Chemical Abstracts, vol. 112, No. 18, Apr. 30, 1990, Yoshikazu Sato et al. "Optical recording media having a photo– and electro–chromic compound dispersed in an electrolytically polymerized membrane." p. 745, col. 2.
Chemical Abstracts, vol. 106, No. 16, Apr. 20, 1987, Masahiro Haruta et al. "Optical recording materials" p. 650, col. 1.
Chemical Abstracts, vol. 105, No. 26, Dec. 29, 1986, Katsumi Yoshino et al. "Optical recording material" p. 614, col. 2.

Primary Examiner—Patrick J. Ryan
Assistant Examiner—Marie R. Macholl
Attorney, Agent, or Firm—Pennie & Edmonds

[57] ABSTRACT

An information recording medium has a recording layer which comprises a composition containing:

I) at least one organic polymer selected from the group consisting of:
(a) conjugated polymers whose conformations change by thermal energy, for example, polythiophene, and
(b) polymers containing as a component a diene monomer and/or an aromatic-ring-containing vinyl monomer, for example, polystyrene; and II) a dye having light-absorbing ability, for example, naphthalocyanine. Despite the recording layer is of the organic type that features non-toxicity and low manufacturing cost as advantages, the recording layer makes it possible to produce a rewritable optical disc which can be recorded by a semiconductor laser (830, 780 nm) employed widely.

12 Claims, 7 Drawing Sheets

INFORMATION RECORDING MEDIUM HAVING RECORDING LAYER WITH ORGANIC POLYMER AND DYE CONTAINED THEREIN

BACKGROUND OF THE INVENTION

1) Field of the Invention

This invention relates to an information recording medium and also to information recording and erasing methods. In particular, this invention is concerned with an information recording medium having a recording layer with an organic polymer and dye contained therein and also with information recording and erasing methods making use of the information recording medium.

2) Description of the Related Art

Conventionally well-known optical recording media include inorganic optical recording media, such as magneto-optic recording media—in each of which a magnetic film is heated to its Curie point or higher by a laser beam, the direction of magnetization at each heated point is rewritten by the application of a magnetic field and a change in the plane of polarization due the Kerr effect is read—and phase-transforming optical recording media in each of which an optical recording medium is caused to undergo a phase transformation (crystalline phase→amorphous phase) by the heat of a laser beam and the reflectivity of light is read.

Magneto-optic recording media are generally equipped with a thin alloy film made of a rare earth element such as Gd or Tb and a transition metal such as Fe, Ni or Co. These thin alloy films are however prone to oxidation by moisture, oxygen in the atmosphere or the like so that their contact with the external atmosphere must be avoided by a protective film made of silicon oxide, silicon nitride or the like. Magneto-optic recording media therefore have a problem in the long-term stability of records. They are also accompanied by the drawback that they require a complex optical system.

Phase-transforming optical recording media are made of a material containing a chalcogen element led by Te, for example, tellurium oxide, a Te—Ge alloy or a Te—Ge—Sb alloy. However these materials have toxicity, and their formation into films requires a vacuum film-forming process such as a sputtering process thereby making it difficult to provide optical recording media at low cost.

With a view toward overcoming the drawbacks described above, active research is now under way with respect to optical recording media made of an organic material for their reduced toxicity and greater economy.

Optical recording media made of an organic material and reported to date include photon-mode optical recording media making use of photons of light and heat-mode optical recording media utilizing heat.

Among these numerous organic rewritable optical recording media reported so far, there are not many optical recording media whose dynamic optical recording/erasing characteristics have been reported. The capabilities of many such optical recording media is, therefore, unknown in terms of record/erase performance.

As one of a few reports which disclose dynamic optical recording/erasing characteristics with respect to rewritable organic optical recording media, there is a report entitled "Characteristics and Problems of Organic Materials for Optical Recording Media" in The Journal of Society for the Study of Organic Electronics, 41–47 (1991). An optical recording medium disclosed therein is of the photon-mode type, with the claim that high sensitivity and high speed can be expected. It makes use of the photochromism of a heterocyclic fulgide. As a matter of fact, dynamic evaluation of the optical recording medium gave a CN value of 49 dB. It is, however, difficult to apply this optical recording medium to an optical recording system equipped with a semiconductor laser because it requires an Ar laser beam for recording and ultraviolet rays for erasure. It also has problems in stability and repeatability since its read-out stability is low due to the use of a photochromic reaction in both recording and read-out.

As such organic optical recording media, there have also been reported those making use of a photochromic material such as spiropyran [see Japanese Patent Application Laid-Open (Kokai) No. SHO 61-170737)], phase separation of a polymer blend, or a change in the orientation of a liquid crystal polymer. Since these optical recording media are of the photon mode, they have advantages such as high sensitivity and high speed. However, they have problems in stability and repeatability because their read-out stability is low due to the use of a photochromic reaction in both recording and read-out.

As a report disclosing dynamic optical recording/erasing characteristics on an optical recording medium of the heat mode type, on the other hand, there is a report entitled "Optical Storage Technology and Applications" in SPIE, 211–218 (1988). This optical recording medium is provided with a recording layer which has been formed by laminating a polymer layer, which shows viscoelasticity and will hereinafter be called an "expansion layer", and a thermosetting resin layer (hereinafter called a "retention layer") one over the other. Recording on this optical recording medium is performed as will be described next. The retention layer is heated to its glass transition temperature higher, and the expansion layer is also heated to have it undergo thermal expansion so that the retention layer is deformed to form bumps. The retention layer is next cooled to a temperature lower than its glass transition temperature, whereby the bumps are solidified and retained. Erasure of the information so recorded can be effected by heating the retention layer, which include the bumps formed as described above, to a temperature at least equal to its glass transition temperature so that its modulus of elasticity is lowered. By contraction force of the expansion layer which has been in the expanded state, the retention layer is drawn back so that the bumps are flattened. Such formation and flattening of bumps can be reversed and, accordingly, the above optical recording medium is rewritable. This optical recording medium, however, requires the incorporation of different dyes in the expansion layer and retention layer, respectively, and to use two types of laser beams having different wavelengths, one for recording and the other for erasure, because the expansion layer is heated upon recording but, upon erasure, the retention layer alone is heated—i.e., without heating the expansion layer.

Further, Japanese Patent Application Laid-Open (Kokai) No. HEI 2-187390 discloses an optical recording medium with a recording layer, which contains a shape memory resin and a dye, formed directly on a substrate. In this optical recording medium, the recording layer is a single layer and, owing to the use of both heat-induced expansibility and subsequent restorability of the shape memory resin, formation of bumps (recording) and their flattening (erasure) can be conducted by changing the degree of heating. This, therefore, has made it possible to perform both recording and erasure by using a laser beam of a single wavelength. The above patent publication however does not disclose any dynamic optical recording/erasure characteristics. Depending on the optical constants, film thickness, film forming property and the like of the recording material employed in the recording layer, it may not be possible to obtain push-pull signal characteristics sufficient to perform tracking servo. It is difficult to obtain good push-pull signal characteristics, for example, where there is only a small difference in the complex index of refraction between a substrate and a recording layer but there is a large difference in the complex index of refraction between the recording layer and air or the recording layer and a layer laminated thereon (for example, a reflective layer or a protective layer). In addition, poor film-forming property of a recording material leads to problems such as higher noise level and tracking failure due to small roughnesses or the like of the recording material.

As a report disclosing dynamic optical recording/erasure characteristics on an optical recording medium of the combined photon and heat mode, reference is had to Optical Memory Symposium '90, 31–32 (Summer, 1990). The optical recording medium, which uses a liquid crystal polymer having photochromic groups, actually gave a CN value in a dynamic evaluation but it was as low as 27 dB. Moreover, it failed to exhibit erasure characteristics (erasure ratio). This optical recording medium also involves the problem that it can hardly be applied to an optical recording system equipped with a semiconductor laser, because it requires ultraviolet rays for erasure.

As recording medium of the heat mode type that uses heat, there is proposed recording through repetition of pit formation and flattening by the use of a thermoplastic polymer and an organic dye [Japanese Patent Application Laid-Open (Kokai) No. SHO 58-48245]. Because of the reliance on an irreversible change in profile of the recording medium, this recording medium involves the problem that erasure of a record is extremely difficult.

SUMMARY OF THE INVENTION

With the foregoing in view, the present invention has as a primary object the provision of an information recording medium having a recording layer with an organic polymer and dye contained therein.

The present invention therefore provides an information recording medium having a recording layer. The recording layer comprises a composition containing:

I) at least one organic polymer selected from the group consisting of:
  (a) conjugated polymers whose conformations change by thermal energy, and
  (b) polymers containing as a component a diene monomer and/or an aromatic-ring-containing vinyl monomer, and II) a dye having light absorbing ability.

When the resin composition composed of the conjugated polymer and the dye is heated by illumination of light, radiation of heat or contact to a heating means, the conjugated polymer as a matrix of the composition varies in conformation in accordance with the level of the thermal energy or optical energy. In other words, when the above resin composition is heated, electronic interaction and/or steric arrangement between the dye and the conjugated polymer varies and, moreover, interaction among molecules of the dye also changes so that the state of aggregation of the dye molecules changes. These changes can be observed as a change in optical absorption and/or reflection spectra of the resin composition. The degree of this change is determined by the temperature to which the resin composition has been heated. By quenching the resin composition subsequent to its heating, the changes in the above optical absorption and reflection spectra can be fixed and retained. Recording of information on the information recording medium according to this invention makes use of such properties of the resin composition. Accordingly, the record can be erased by heating at least recorded points and then gradually cooling the points.

To induce optical variations in the resin composition made of the polymer—said polymer containing as a component the diene monomer and/or the aromatic-ring-containing vinyl monomer—and the dye, the recording layer is heated by illuminating it with light whose wavelength corresponds to the absorption wavelength of the dye or is heated in an oven or by a heating means such as a micro-heating element. Interaction between the polymer and the dye and/or among molecules of the dye therefore changes. As a result, the absorbance, reflectivity or transmittance varies at each heated point compared with the corresponding value before the heating. At this time, heated points may be changed in profile. It is, however, preferred to adjust the degree of heating, for example, the intensity and illumination time of the light, namely, the heating temperature so that such changes in profile can be minimized.

An optical recording medium is constructed of (A) a substrate, (B) a recording layer formed on the substrate, and (C) a reflective layer formed on the recording layer. Light is illuminated onto the recording layer from the side of the substrate so that a characteristic of the recording layer, such as its absorbance, is changed compared with the corresponding value before the illumination of the light thereby making it possible to record information. Read-out of the information, on the other hand, is performed in the following manner. From the side of the substrate the recording layer with the information recorded therein is illuminated by light which can detect the above changes in the characteristic of the recording layer but causes no additional changes in the characteristic of the recording layer. The light advances through the recording layer and is then reflected by the reflective layer. The intensity of the light so reflected is then detected. The recorded information is read using the difference in intensity between the reflected light corresponding to each information-recorded point and that corresponding to a point where no information is recorded.

Optical recording systems presently available on the market are dominated by those using high-intensity reflected light for information-unrecorded points and low-intensity reflected light for information-recorded points.

In the information recording medium according to this invention, application of thermal energy to the recording layer, for example, by illumination of light leads to an increase in absorbance at each illuminated point, in other words, to a decrease in transmittance or reflectivity at each illuminated point, whereby the information recording medium is in conformity with the manner of a change in reflectivity from a high level to a low level upon recording, said manner being over-whelmingly adopted in the present optical recording systems. An information recording medium with a recording layer formed of (I) an organic polymer and (II) a dye having light absorbing ability, in other words, of the organic type and capable of increasing its absorbance at points illuminated by light has now been successfully provided for the first time by the present invention.

Low-price lasers are used in compact disc (CD) players which are widely used these days. Recorded signals cannot be read fully if the power of a laser is so small that the reflectivity of read-out light from an information-unrecorded point is lower than 60%. If the reflectivity of an information-unrecorded point for reading light (for example, of 780 nm wavelength) is at least 60% and the reflectivity changes from a higher level to a lower level upon recording, such CDs can be used as recordable CDs yet they can still be played on today's CD players, which are designed exclusively for playback.

Described specifically, semiconductor lasers are used as such low-price lasers. The wavelength range of light usable by these semiconductor lasers is 750–840 nm. An information recording medium with a recording layer formed of (I) an organic polymer and (II) a dye having light absorbing ability, in other words, of the organic type and capable of increasing its absorbance at points illuminated by light has now been successfully provided for the first time by the present invention.

The resin composition, which can be called a "function resin composition" has a wide variety of utility as sensors such as temperature sensors and light sensors, switching elements and information recording media by forming it as a thin film on various suitable substrates or bases.

DETAILED DESCRIPTION OF THE INVENTION AND PREFERRED EMBODIMENTS

Figure 1:
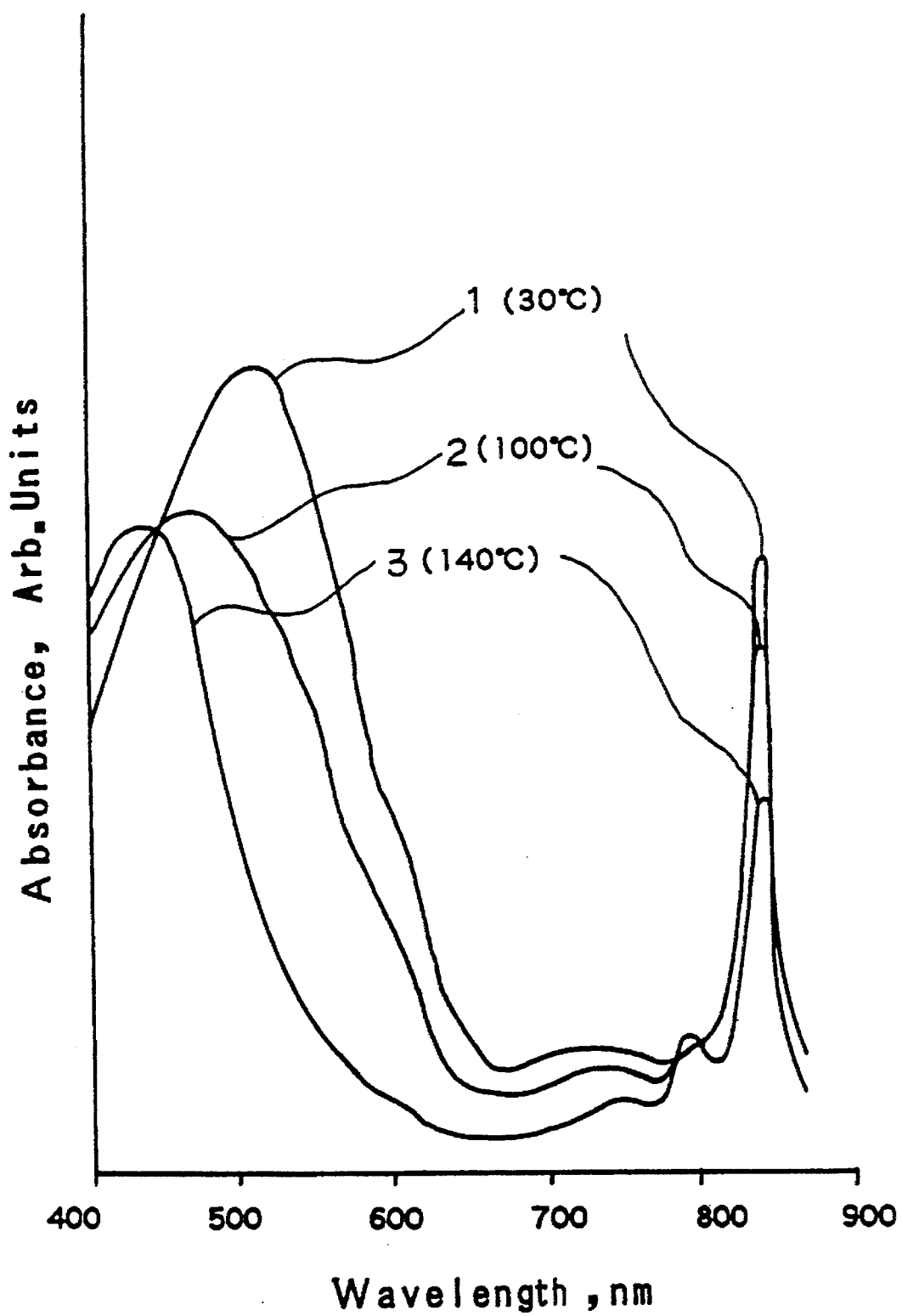
FIGS. 1 and 2 are visible absorption spectra of a function resin composition obtained in Referential Example 1.

The information recording medium according to this invention, in one aspect of this invention, has a recording layer which is made of a resin composition containing a conjugated polymer whose conformation changes by thermal energy and a dye having light absorbing ability.

Particularly preferred examples of the conjugated polymer include those containing heterocyclic 5-membered rings or 6-membered carbon rings, which rings form conjugated systems. These rings may be condensed on a backbone. Usable examples are polymers containing structural units represented by the following formula (I):

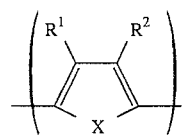
(I)

wherein $R^1$ and $R^2$ are the same or different and mean a hydrogen atom or a monovalent organic group with the proviso that at least one of $R^1$ and $R^2$ stands for a monovalent organic group, and X denotes S, O, Se or $NR^3$, $R^3$ being a hydrogen atom or an alkyl or aryl group.

Where $R^1$ or $R_2$ is a monovalent organic group in the formula (I), illustrative of the organic group includes alkyl, alkenyl, alkoxyl, alkanoyl, alkylthio, alkylthioalkyl, alkylsulfinyl, alkylsufonyl, cycloalkyl, alkylsulfinylalkyl, alkylsulfonylalkyl, aryl, arylalkyl, alkylaryl, arylthio, cycloalkenyl, arylsulfinyl and aryl sulfonyl groups. In the above-exemplified groups, the alkyl groups may be substituted by one or more sulfonic groups, halogen atoms, nitro groups, cyano groups, carboxyl groups, epoxy groups and/or the like. Where $R^1$ or $R_2$ group is a monovalent organic group, the inclusion of the monovalent organic group is important in imparting the polymer with solubility in an organic solvent. Examples of the above alkyl group include $C_4$–$C_{18}$ alkyl groups, for example, butyl, pentyl, hexyl, octyl, nonyl, decyl, dodecyl, tetradecyl and octadecyl groups. Examples of the alkenyl group include vinyl, allyl and 1-butenyl groups. Illustrative of the alkoxyl group include methoxyl, ethoxyl, buthoxyl and pentyloxyl groups. Illustrative of the alkanoyl groups include hexanoyl and octanoyl groups. Examples of the alkylthio group include pentylthio, hexylthio, and decylthio groups. Exemplary alkylthioalkyl groups include butylthiomethyl and hexylthiobutyl groups. Exemplary alkylsulfinyl groups include hexylsulfinyl and octylsulfinyl groups. Exemplary alkylsulfonyl groups include pentylsulfonyl and nonylsulfonyl groups. Exemplary cycloalkyl groups include cyclopentyl and cyclohexyl groups. Exemplary alkylsulfinylalkyl groups include octylsulfinylbutyl and butylsulfinylhexyl groups. Exemplary alkylsulfonylalkyl groups include butylsulfonyldecyl and methylsulfonyldodecyl groups. Illustrative of the aryl group include phenyl and naphthyl groups. Exemplary arylalkyl groups include benzyl and phenethyl groups. Exemplary alkylaryl groups include butylphenyl and isopropylphenyl groups. The arylthio group is, for example, a naphthylthio group or the like. The cycloalkenyl group is, for example, a 1-cyclohexenyl group or the like. The arylsulfinyl group is, for example, a phenylsulfinyl group or the like. The arylsulfonyl group is, for example, a phenylsulfonyl group or the like. In the above groups, the alkyl groups may be substituted by one or more sulfonic groups, halogen atoms, nitro groups, cyano groups, carboxyl groups, epoxy groups, glycidyl groups and/or the like.

The polymers containing structural units represented by the formula (I) can each be produced by polymerizing a monomer represented by the following formula (II):

(II)

wherein $R^1$, $R^2$ and X have the same meanings as defined in formula (I), or a derivative thereof. Its polymerization process can be a chemical oxidative polymerization process, a chemical polymerization process, an electrochemical polymerization process or the like. According to the chemical oxidative polymerization process, the above monomer is polymerized in the presence of an oxidizing agent such as ferric chloride in chloroform. In the chemical polymerization process, the 2,5-dibromo-substituted or 2,5-diiodo-substituted derivative as a derivative of the above monomer is polymerized in the presence of a nickel-base catalyst such as 1,3-(bisphenylphosphino)propane nickel(II) chloride in an ether solvent such as tetrahydrofuran. According to the electrochemical polymerization process, a current is caused to flow across a reaction mixture—said reaction mixture having been formed by dissolving the above monomer and a supporting electrolyte such as tetramethylammonium perchlorate in a solvent such as nitrobenzene—in an inert atmosphere such as helium or argon while using an ITO (indium tin oxide) electrode as an anode and a platinum electrode as a cathode, whereby a polymer is caused to deposit on the anode. It is desirable to wash the polymer, which has been obtained by such a polymerization process, with methanol, acetone or the like so that the polymer can be provided in a clean form. Upon the above polymerization, two or more monomers of the above formula (II) can be used in combination, or a monomer represented by the formula (II)—such as the monomer (II) in which $R^1$ and $R^2$ are each a hydrogen atom or its 2,5-dibromo- or 2,5-diiodo-substituted derivative—or a derivative thereof can be used in combination with a monomer copolymerizable with the monomer (II).

Although no particular limitation is imposed on the molecular weight of the polymer containing structural units represented by the formula (I), the average molecular weight (weight average molecular weight; the term "average molecular weight" will hereinafter have the same meaning) can be preferably $10^2$–$10^6$, most preferably $10^3$–$10^5$ from the standpoint of good film-forming properties. Incidentally, the term "average molecular weight" as used herein means an average molecular weight as determined by liquid gel permeation chromatography with reference to a calibration curve prepared using standard polystyrene.

No particular limitation is imposed on the dye usable in the present invention insofar as it has light absorbing ability and has electronic or steric interaction with the conjugated polymer. Preferred usable dyes include those capable of sufficiently absorbing a laser beam, for example, cyanine dyes, phthalocyanine dyes, tetrapyradinoporphyradine dyes, naphthalocyanine dyes and nickel dithiol complexes.

Particularly preferred examples of the above dye are tetraazaporphyrin dyes, namely, phthalocyanine dyes and naphthalocyanine dyes, which include, for example, those represented by the following formula (III), (IV) or (V):

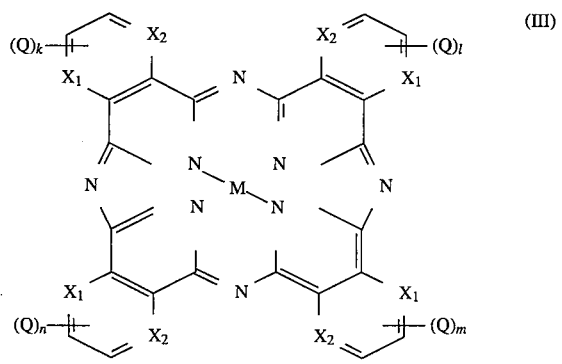

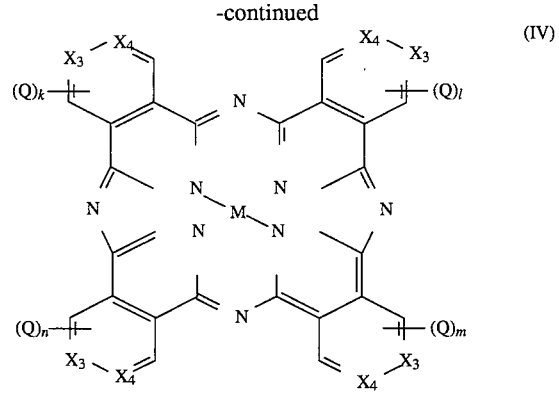

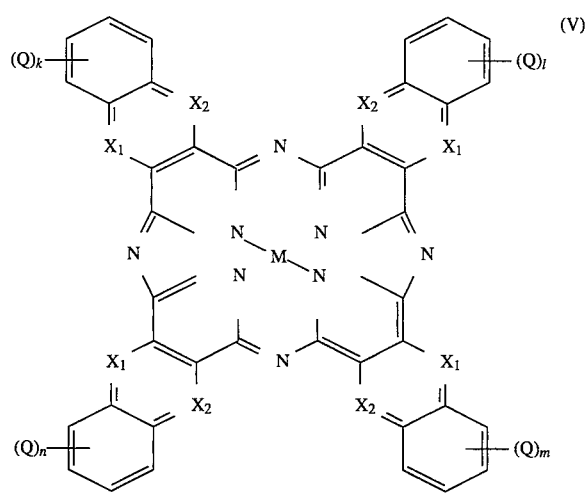

In each of the above formulae (III), (IV) and (V), M means two hydrogen atoms, a Group Ib, IIa, IIb, IIIa, IVa, IVb, Vb, VIb, VIIb or VIII metal, an oxide of the metal, a halide of the metal, the hydroxide of the metal or the metal having one or more substituent groups, Q denotes a substituent, and k, l, m and n individually stand for 0 or an integer of 1–4, and, where there are plural Qs, they may be the same or different.

Examples of the metals represented by M include Cu, Zn, Mg, Al, Ge, Ti, Sn, Pb, Cr, Mo, Mn, Fe, Co, Ni, In, Pt and Pd, with Si, Ge and Sn being particularly preferred. TiO, VO and the like can be mentioned as exemplary oxides; $AlCl_3$, $GeCl_2$, $SiCl_2$, FeCl, $SnCl_2$, InCl and the like as exemplary halides; and $Al(OH)_3$, $Si(OH)_2$, $Ge(OH)_2$, $Sn(OH)_2$ and the like. Where M stands for a metal having one or more substituent groups, examples of the metal include Al, Ti, Si, Ge and Sn while examples of the substituent groups include aryloxy, alkoxyl, alkylsilyl, trialkylsiloxy, arylsiloxy, triarylsiloxy, alkoxysiloxy, trialkoxysiloxy, aryloxysiloxy, triaryloxysiloxyl, trityloxy and acyloxy groups. The terms "alkyl group" and "alkoxyl group" shall hereinafter be interpreted as embracing cycloalkyl groups and cycloalkoxyl groups, respectively. Describing examples of substituent groups in further detail, there are phenoxyl, tolyloxyl and anisyloxyl groups as exemplary aryloxyl groups; amyloxyl, hexyloxyl, octyloxyl, decyloxyl, dodecyloxyl, tetradecyloxyl, hexadecyloxyl, octadecyloxyl, eicosyloxyl, docosyloxyl groups as exemplary alkoxyl groups; trimethylsiloxyl, triethylsiloxyl, tripropylsiloxyl and tributylsiloxyl groups as exemplary trialkylsiloxyl groups; triphenylsiloxyl, trianisyloxyl and tritolylsiloxyl groups as exemplary triarylsiloxyl groups; trimethoxysiloxyl, triethoxysiloxyl, tripropoxysiloxyl and tributoxysiloxyl groups as exemplary trialkoxy siloxyl groups; triphenoxysiloxyl, trianiloxysiloxyl and tritolyloxysiloxyl groups as triaryloxysiloxyl groups; acetoxyl, propionyloxyl, butyryloxyl, valeryloxyl, pivaloyloxyl, hexanoyloxyl and octanoyloxyl groups as exemplary acyloxyl groups.

Examples of the substituent represented by Q include alkyl, aryl, alkoxyl, aryloxyl, alkoxyalkyl, alkoxycarbonyl, aralkyl and aryloxycarbonyl groups; halogen atoms; amino groups which may optionally be N-substituted by one or two alkyl and/or aryl groups; sulfonamido groups which may optionally be N-substituted by one or two alkyl and/or aryl groups; nitro, alkylthio, arylthio, alkylsilylthio, alkylsilyl, alkylsulfonyl and arylsufonyl groups. These substituent groups may be substituted by one or more halogen atoms, hydroxyl groups, alkoxyl groups and/or the like.

In the above formulae (III) and (V), $X_1$ and $X_2$ contained in each common ring may be both carbon atoms or nitrogen atoms, or one of $X_1$ and $X_2$ is a carbon atom and the other is a nitrogen atom. The plural $X_1$s may be the same or different and the plural $X_2$s may also be the same or different. In the above formula (IV), one of $X_3$ and $X_4$ contained in each common ring is a carbon atom and the other is a nitrogen atom. The plural $X_3$s may be the same or different and the plural $X_4$s may also be the same or different.

Among the compounds represented by the formula (V), examples of naphthalocyanine derivatives include those represented by the following formula (VI):

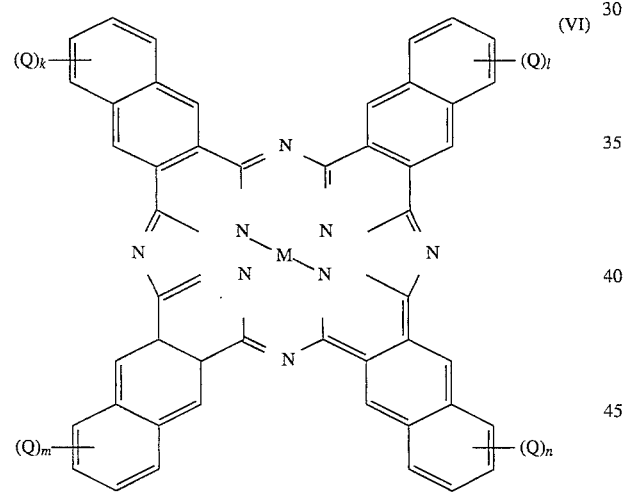

wherein Q, k, l, m, n and M have the same meanings as defined in formulae (III) to (V).

Specific naphthalocyanine derivatives include, for example, bis[tri-n-hexyloxy]siliconnaphthalocyanine, dichlorosiliconpoly-N-di-n-octylsulfonamidonaphthalocyanine, dihydroxysiliconpoly-N-di-n-octylsulfonamidonaphthalocyanine, bis[tri-n-hexylsiloxy]siliconpoly-N-di-n-octylsulfonamidonaphthalocyanine, bis[hydroxyheptapropylenoxydimethylsiloxy]silicontetrachloronaphthalocyanine, bis[trihexylsiloxy]silicontetraneopentoxynaphthalocyanine, bis[trihexylsiloxy]silicontetra-N-piperidylnaphthalocyanine, copper tetrafluoromethylnaphthalocyanine, dizinc tetrabromonaphthalocyanine, butylphenylthioaluminum tetrabutoxynaphthalocyanine, vanadyl tributylthionaphthalocyanine, titanyl tetra-n-hexylthionaphthalocyanine, and nickel octaphenylthionaphthalocyanine. Also included are those containing the Ms, Zs and $R_1$s of Qs (each shown in terms of $—Z—R^1$), Ks, ls, ms and ns presented below in Tables 1, 2, 3, 4, 5, 6 and 7.

TABLE 1

Examples of Compounds

| Compound No. | M | Z | $R^1$ | k, l, m, n |
|---|---|---|---|---|
| 1 | Si-[OSi(C₂H₅)₃]₂ | S | —C₁₀H₂₁ | 1, each |
| 2 | Si-[OSi(C₄H₉)₃]₂ | S | —C₁₀H₂₁ | 1, each |
| 3 | Si-[OSi(C₆H₁₃)₃]₂ | S | —CH₂—⌬ | 1, each |
| 4 | Si-[OC₂₁H₄₃)₂ | S | —CH₂—⌬ | 1, each |
| 5 | Ge-[OSi(C₄H₉)₃]₂ | S | —CH₂—⌬ | 1, each |
| 6 | Ge-[OC₁₈H₃₇)₂ | S | —CH₂—⌬ | 1, each |
| 7 | Sn-[OSi(C₃H₇)₃]₂ | S | —CH₂—⌬ | 1, each |

TABLE 2

Examples of Compounds

| Compound No. | M | Z | $R^1$ | k, l, m, n |
|---|---|---|---|---|
| 8 | Sn-[OC₂₂H₄₅)₂ | S | —CH₂—⌬ | 1, each |
| 9 | Si-[OSi(C₆H₁₃)₃]₂ | S | —C₂H₄OC₂H₄OCH₃ | 1, each |
| 10 | Ge-[OC₂₂H₄₅)₂ | S | —C₂H₄—⌬ | 1, each |
| 11 | Sn-[OC₁₈H₃₇)₂ | S | —CF₃ | 2, each |
| 12 | Ge-[OSi(C₄H₉)₃]₂ | S | ⌬—OCH₃ | 1, each |
| 13 | Si-[OSi(C₆H₁₃)₃]₂ | S | —C₄H₉ | 2, each |
| 14 | Ge-[OSi(C₄H₉)₃]₂ | S | —C₁₀H₂₁ | 2, each |
| 15 | Sn-[OC₁₇H₃₅)₂ | S | —C₁₀H₂₁ | 1, each |
| 16 | Si-[OSi(C₃H₇)₃]₂ | S | —C₁₆H₃₃ | 1, each |

TABLE 3

Examples of Compounds

| Compound No. | M | Z | R$^1$ | k, l, m, n |
|---|---|---|---|---|
| 17 | Si$\pm$OSi(CH$_3$)$_3$]$_2$ | S | $-C_{14}H_{29}$ | 1, each |
| 18 | Si$\pm$OSi(CH$_3$)$_3$]$_2$ | S | two $-C_{22}H_{45}$s + two $-C_2H_5$s | 1, each |
| 19 | Si$\pm$OSi(CH$_6$H$_{13}$)$_3$]$_2$ | S | $-C_6H_{13}$ | 1, each |
| 20 | Si$\pm$OSi(C$_2$H$_5$)$_3$]$_2$ | S | $-C_2H_4-\underset{\underset{O}{\|}}{C}-O-C_8H_{17}$ | 1, each |
| 21 | Si$\pm$OSi(C$_3$H$_7$)$_3$]$_2$ | S | $-C_2H_4-\underset{\underset{O}{\|}}{C}-O-C_4H_8-OCH_3$ | 1, each |
| 22 | Si$\pm$OSi(C$_2$H$_5$)$_3$]$_2$ | S | $-C_2H_4-\underset{\underset{O}{\|}}{C}-O-CH_2-\underset{\underset{CH_3}{\|}}{\overset{\overset{CH_3}{\|}}{C}}-CH_2-(t-C_4H_9)$ | 1, each |

TABLE 4

Examples of Compounds

| Compound No. | M | Z | R$^1$ | k, l, m, n |
|---|---|---|---|---|
| 23 | Si$\pm$OSi(C$_2$H$_5$)$_3$]$_2$ | S | $-CH_2-\underset{\underset{O}{\|}}{C}-NH-C-$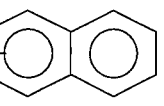 | 1, each |
| 24 | Si$\pm$OSi(C$_4$H$_9$)$_3$]$_2$ | S | $-C_2H_4OH$ | 1, each |
| 25 | Si$\pm$OSi(C$_4$H$_9$)$_3$]$_2$ | S | $-CH_3-\underset{\underset{OH}{\|}}{CH}-CH_2OH$ | 1, each |
| 26 | Si$\pm$OSi(C$_2$H$_5$)$_3$]$_2$ | S | $-CH_2-\underset{\underset{O}{\|}}{C}-O-CH_2-\underset{\diagdown CH_3}{\overset{\diagup CH_3}{C-H}}$ | 1, each |
| 27 | Si$\pm$OSi(C$_4$H$_9$)$_3$]$_2$ | S | cyclopentyl | 1, each |
| 28 | Si$\pm$OSi(C$_2$H$_9$)$_3$]$_2$ | S | cyclohexyl | 1, each |
| 29 | Si$\pm$OSi(C$_4$H$_9$)$_3$]$_2$ | S | 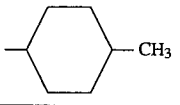 | 1, each |

TABLE 5

Examples of Compounds

| Compound No. | M | Z | R$^1$ | k, l, m, n |
|---|---|---|---|---|
| 30 | Si$\pm$OSi(C$_4$H$_9$)$_3$]$_2$ | S | 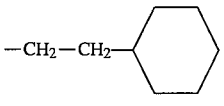 | 1, each |
| 31 | Si$\pm$OSi(C$_3$H$_7$)$_3$]$_2$ | S | 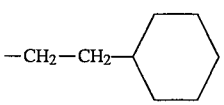 | 1, each |

TABLE 5-continued

Examples of Compounds

| Compound No. | M | Z | R¹ | k, l, m, n |
|---|---|---|---|---|
| 32 | Si–[OSi(CH₃)₂R″]₃<br>(R″: —CH₂—CH=CH₂) | S | cyclohexyl | 1, each |
| 33 | Si–[OSI(C₄H₉)₃]₂ | S | ⟨cyclohexyl⟩—CH₃ | 2, each |
| 34 | Si—(—OSi—(⟨cyclohexyl⟩)₃—)₂ | S | —C₄H₉ | 1, each |
| 35 | Ge–[OSi(C₄H₉)₃]₂ | S | ⟨cyclohexyl⟩ | 1, each |

TABLE 6

Examples of Compounds

| Compound No. | M | Z | R¹ | k, l, m, n |
|---|---|---|---|---|
| 36 | Ge–[OSi(C₃H₇)₃]₂ | S | ⟨decalin⟩ | 1, each |
| 37 | Sn—(—OSi—(⟨cyclohexyl⟩)₃—)₂ | S | —C₁₀H₂₁ | 1, each |
| 38 | Sn—(—OSi—(⟨cyclohexyl⟩)₃—)₂ | S | cyclohexyl | 1, each |
| 39 | Si–[OSi(C₄H₉)₃]₂ | S | —CH₂Si(CH₃)₃ | 1, each |
| 40 | Si–[OSi(C₂H₅)₃]₂ | S | –(CH₂)₂Si(C₂H₅)₂ | 1, each |
| 41 | Si–[OSi(CH₃)₃]₂ | S | —CH₂Si(OCH₃)₃ | 1, each |
| 42 | Si–[OSi(C₂H₅)₃]₂ | SO₂ | —C₁₆H₃₃ | 1, each |
| 43 | Si–[OSi(C₂H₅)₂R‴]₃<br>(R‴: —OCH(CH₃)CO₂C₂H₅) | SO₂ | —C₄H₉ | 1, each |

TABLE 7

Examples of Compounds

| Compound No. | M | Z | R¹ | k, l, m, n |
|---|---|---|---|---|
| 44 | Ge–[OSi(C₂H₅)₃]₂ | SO₂ | —C₁₀H₂₁ | 1, each |
| 45 | SiCl₂ | SO₂ | —C₆H₁₃ | 1, each |
| 46 | Ge(OH)₂ | SO₂ | —C₁₀H₂₁ | 2, each |
| 47 | GeCl₂ | SO₂ | —C₄H₉ | 1, each |

In Tables 1 to 7 described above, the presentation of only one example of $R^1$ indicates that all the plural $R^1$s are the same.

The information recording medium according to this invention, in another aspect of this invention, has a recording layer which is made of a resin composition containing a polymer, which in turn contains as a component a diene monomer and/or an aromatic-ring-containing vinyl monomer, and a dye having light absorbing ability.

Upon illumination of thermal energy onto the recording layer, interaction between the polymer and the dye and/or among molecules of the dye varies so that a change takes place in absorbance, reflectivity or transmittance. At this time, the recording layer may change in profile.

Illustrative examples of the polymer employed in the recording layer include polymers of diene monomers, polymers of aromatic-ring-containing vinyl monomers, copolymers of diene monomers and aromatic-ring-containing vinyl monomers, and copolymers of diene monomers and/or aromatic-ring-containing vinyl monomers and vinyl monomers other than the diene monomers and the aromatic-ring-containing vinyl monomers. Illustrative diene monomers include butadiene, isoprene, chloroprene, piperylene and 2-phenylbutadiene. Illustrative examples of aromatic-ring-containing vinyl monomers include styrene; alkyl-substituted styrenes such as α-methylstyrene and 4-ethylstyrene; alkylthio-substituted styrenes such as 4-ethylthiostyrene; alkoxyl-substituted styrenes such as 4-propoxystyrene; alkoxyalkyl-substituted styrenes such as 4-propoxymethylstyrene; alkoxycarbonyl-substituted styrene such as 4-propoxycarbonylstyrene; styrene derivatives such as halogenated styrenes; vinylnaphthalenes (in which the naphthalene ring may be substituted by one or more alkyl groups, alkoxyl groups, alkoxyalkyl groups, alkylthio groups, alkoxylcarbonyl groups and/or the like); vinylanthracenes (in which the anthracene ring may be substituted by one or more alkyl groups, alkoxyl groups, alkoxyalkyl groups, alkylthio groups, alkoxylcarbonyl groups and/or the like); and N-vinylcarbazoles (in which the ring may be substituted by one or more alkyl groups, alkoxyl groups, alkoxyalkyl groups, alkylthio groups, alkoxylcarbonyl groups and/or the like). Examples of vinyl monomers other than the diene monomers and aromatic-ring-containing vinyl monomers include acrylonitrile, methyl methacrylate, methyl acrylate and divinylbenzene. These compounds can be used as needed to an extent not impairing the characteristics of the information recording medium of this invention. Specific examples of polymers usable in the recording layer include trans-polybutadiene, 1,2-polybutadiene, cis-polybutadiene, trans-polyisoprene, cis-polyisoprene, trans-polychloroprene, 1,2-polychloroprene, poly(2-phenyl-1,3-butadiene), polystyrene, polychlorostyrene, poly-α-methylstyrene, poly(4-ethyl)styrene, poly(4-ethylthio)styrene, poly(4-propoxy)styrene, poly(2-propoxymethyl)styrene, poly(4-propoxycarbonyl)styrene, butadiene-styrene copolymers (random copolymers, block copolymers), isoprene-styrene copolymers (random copolymers, block copolymers), chloroprene-styrene copolymers (random copolymers, block copolymers), polyvinylnaphthalene, polyvinyl(pentyl)naphthalene, polyvinyl(butoxy)naphthalene, polyvinylanthracene, polyvinyl(heptyl)anthracene, polyvinyl(octoxy)anthracene, polyvinylcarbazole, styrene-vinylcarbazole copolymers (random copolymers, block copolymers), and styrene-divinylbenzene copolymers.

The dye having light absorbing ability, which is employed in the recording layer, is the same as the dye described above.

Although no particular limitation is imposed on the ratio of the dye to the polymer which contains a conjugated polymer or a polymer containing a diene monomer and/or an aromatic-ring-containing vinyl monomer as a component, it is preferable to use the dye in a proportion of 2–30% based on the polymer. Unduly small proportions of the dye involve the potential problem that the recording sensitivity and the CN value may be lowered, while excessively high proportions of the dye have the potential problem that the CN value may drop.

Formation of the recording layer can be conducted either by a wet technique such as spin coating, casting, roll coating, screen printing, dip coating or the Langmuir-Blodgett technique or by a dry technique such as sputtering or vacuum evaporation. When a wet technique is used, the polymer and dye are dissolved in an organic solvent. Illustrative usable organic solvents include toluene, chloroform, tetrahydrofuran and carbon tetrachloride.

In general, the recording layer is formed on a suitable substrate. No particular limitation is imposed on this substrate as long as it is a light-transmitting flat disc which does not give any problem in recording or reading signals. For example, a disc made of a polycarbonate resin, polymethyl methacrylate, an epoxy resin, glass or the like can be used. The disc may contain concavities or convexities such as guide grooves, pits or the like in a surface thereof.

The information recording medium according to this invention may additionally contain a substrate reflective layer laminated between the substrate and the recording layer. The lamination of the substrate reflective layer permits easy tracking and also allows to improve the reflectivity and recording characteristics such as the CN value. No particular limitation is imposed on this substrate reflective layer as long as it has enough light transmittance to allow writing light to sufficiently reach the recording layer without thermal fusion or decomposition by the light. Preferred are those made of organic dyes or inorganic substances, the real parts (n) of whose complex indexes of refraction are greater than the refractive index of the substrate. Preferred examples of organic pigments include cyanine dyes, phthalocyanine dyes, tetrapyrazinoporphyradine dyes, porphyrin dyes, and azo dyes. To form a reflective layer by using such a dye, it is possible to rely upon a wet coating technique such as spin coating or casting when the dye is soluble in a suitable organic solvent or upon a dry coating technique such as vacuum evaporation. Examples of inorganic substances include Si, $TiO_2$, ZnO and ZnS. They can be formed into a film by sputtering, vacuum evaporation, CVD or the like.

Further, the information recording medium according to this invention may additionally contain a substrate protecting layer laminated between the substrate and the recording layer. The lamination of the substrate protecting layer can protect the substrate from erosion by an organic solvent when the recording layer is formed by a wet coating technique such as spin coating or casting. For the formation of the substrate protecting layer, $SiO_2$, $TiO_2$, an epoxy resin, a photosetting acrylic resin or the like can be used.

In the information recording medium according to this invention, a reflective film made of a metal such as Al, Au, Cu or Ag or a semiconductor such as Si can be formed on the recording layer as needed. A protective layer can also be provided on the recording layer or the reflective film.

Recording of information on the information recording medium of this invention can be performed by applying thermal energy to the information recording medium and then quenching it. The application of thermal energy can be effected, for example, by illumination of light, radiation of heat, contact to a heating means. For example, information can be recorded by illuminating light, whose wavelength corresponds to the absorption wavelength of the dye, onto the recording medium to heat the illuminated points and then quenching the thus-heated points. It can also be effected by heating the recording medium with a heating means, followed by quenching. By the application of the thermal energy, interaction between the polymer and the dye and/or among molecules of the dye changes at the illuminated points of the recording layer. As a result, the absorbance or reflectivity of the recording layer changes at each illuminated point compared with the corresponding value before the illumination of the light. A laser beam is preferred as the light. A semiconductor laser, argon laser, helium-neon laser or the like is used as a laser, depending on the absorption wavelength of the dye. Use of a semiconductor laser is preferred for its small dimensions and light weight. When a laser beam is illuminated for a short time onto the information recording medium under rotation, each heated spot is readily quenched as soon as the illuminated spot rotates past the laser spot.

Read-out of the information recorded as described above can be performed by illuminating light, whose intensity is lower than the light used during the recording or light used during the below-described erasure, and detecting a difference in absorbance or reflectivity between each recorded point and the non-recorded area.

Erasure of the information recorded as described above can be effected by heating at least recorded points and then gradually cooling them. For this heating, the information recording medium can be heated entirely or the recorded points or the recorded points and the unrecorded area can be heated by illumination of a laser beam. When a laser beam is employed, the laser beam is supposed to have an output lower than the laser beam employed during the recording and tracks containing the recorded points are scanned by the laser beam. When the information recording medium is heated entirely in an oven, it is only necessary to heat the recording medium at a temperature lower than the temperature of the points illuminated at the time of the recording and then to allow it to stand until it becomes cool.

The present invention will hereinafter be described in detail by the following examples.

Referential Example 1

(synthesis of a conjugated polymer and performance of a resin composition)

Charged in a flask were 2.34 g (0.096 mole) of magnesium, 50 ml of diethyl ether, 0.77 mole of 1-bromododecane and a small amount of iodine pieces. The contents were heated under reflux and stirring for about 30 minutes, whereby a diethyl ether solution of dodecylmagnesium bromide as a Grignard reagent was obtained. The solution was added with 0.064 mole of 3-bromothiophene and 0.37 mole of 1,3-bis(diphenylphosphino)propanenickel (II) chloride, followed by a reaction at room temperature for 24 hours under a nitrogen gas stream. After the reaction, the reaction mixture was washed with water and the diethyl ether layer was collected. Diethyl ether was distilled off under reduced pressure so that 3-dodecylthiophene was obtained.

In 118.8 ml of chloroform, 0.012 mole of the 3-dodecylthiophene so obtained was polymerized in the presence of 0.048 mole of ferric chloride. After the polymerization, the reaction mixture was poured into methanol and the resulting precipitate was collected. The precipitate was washed in a Soxhlet extractor while using acetone and methanol. The thus-washed precipitate was dried whereby poly(3-dodecylthiophene) was obtained.

Poly(3-dodecylthiophene) (100 parts by weight; all designations of "part" or "parts" will hereinafter mean part or parts by weight unless otherwise specifically indicated), 10 parts of bis(triethylsiloxy)silicon-tetrakis(decylthio)naphthalocyanine and 5,000 parts of toluene were then mixed into a liquid formulation. A glass substrate was spin-coated with the liquid formulation, whereby a thin film (thickness: 900 Å) was formed. To investigate any relationship between a visible absorption spectrum of the thus-formed film and its temperature, the film was successively heated to 30° C., 100° C., 120° C. and 140° C., for 8 minutes at each temperature. In the heated states, its absorption spectra were measured over 400 nm to 900 nm by a spectrophotometer ("U-3400", trade name; manufactured by Hitachi, Ltd.), respectively. The results are shown in FIG. 1, in which Curve 1 indicates the absorption spectrum when heated at 30° C., Curve 2 the absorption spectrum when heated at 100° C., and Curve 3 the absorption spectrum when heated at 140° C. As is evident from the absorption spectra shown in FIG. 1, it has been confirmed that the absorption spectrum changes with the heating temperature, including not only a change around 400 nm to 650 nm based on poly(3-dodecylthiophene) but also a change in the wavelength range (around 830 nm) of the semiconductor laser (based on the existence of the dye). Subsequently, the film was heated successively at 140° C., 100° C. and 30° C. and its visible absorption spectra were measured, respectively, in the same manner as described above. At the respective heating temperatures, absorption spectra similar to that described above were obtained.

Figure 2:
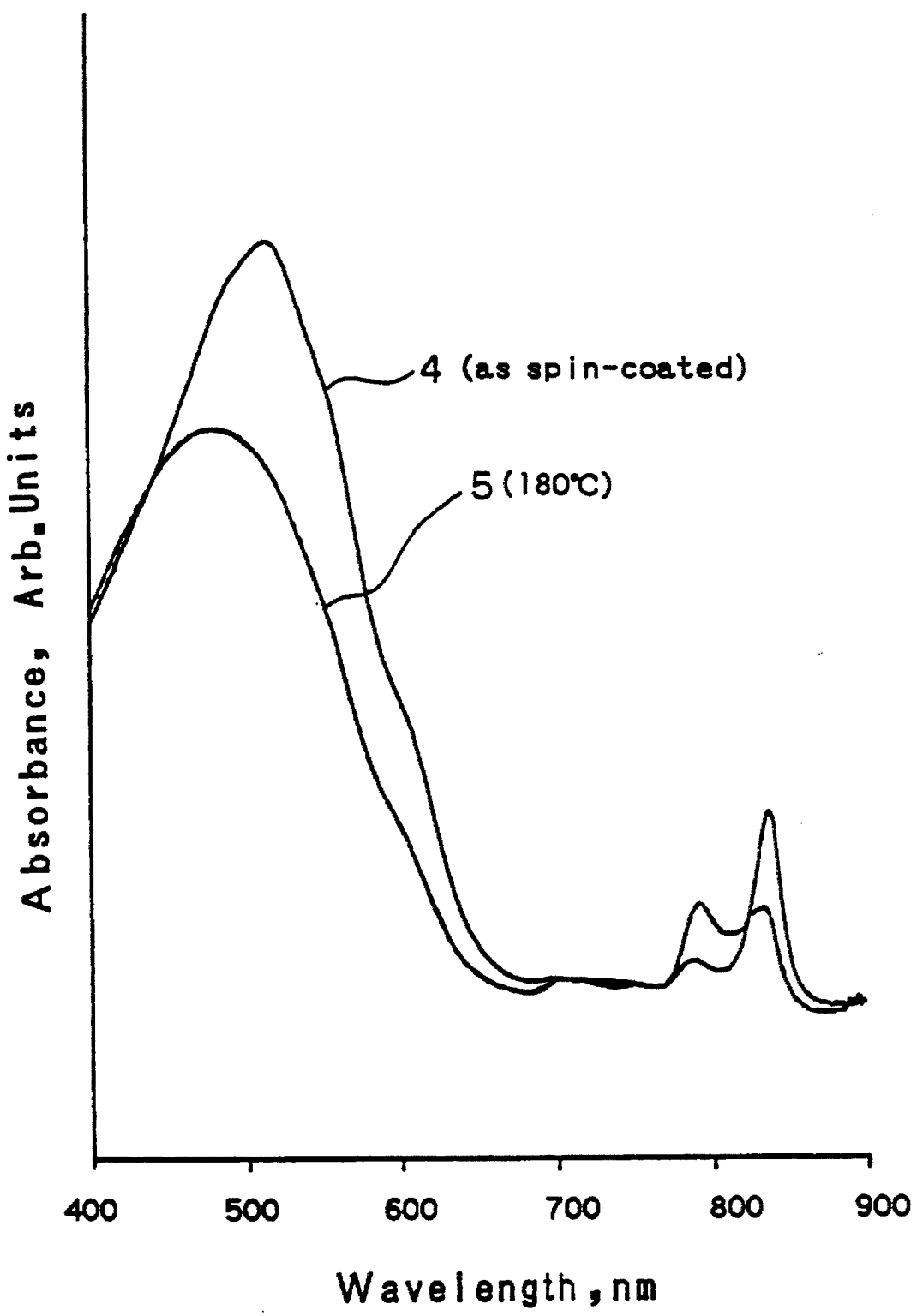

By quenching the film subsequent to its heating, it was possible to fix and retain the changes in the absorption spectrum, said changes having taken place during the heating. The results are shown in FIG. 2, in which Curve 4 indicates an absorption spectrum of the film as formed and Curve 5 shows an absorption spectrum of the film when quenched in ice water (1°±1° C.) after being heated at 180° C. for 1 minute.

Referential Example 2

(synthesis of a conjugated polymer and performance of a resin composition)

3-Hexylthiophene was synthesized in a similar manner to Referential Example 1 except for the use of hexylmagnesium bromide in lieu of dodecylmagnesium bromide. Following the procedure of Referential Example 1, poly(3-hexylthiophene) was then produced in a similar manner to Referential Example 1 except for the use of 3-hexylthiophene in place of 3-dodecylthiophene.

Figure 3:
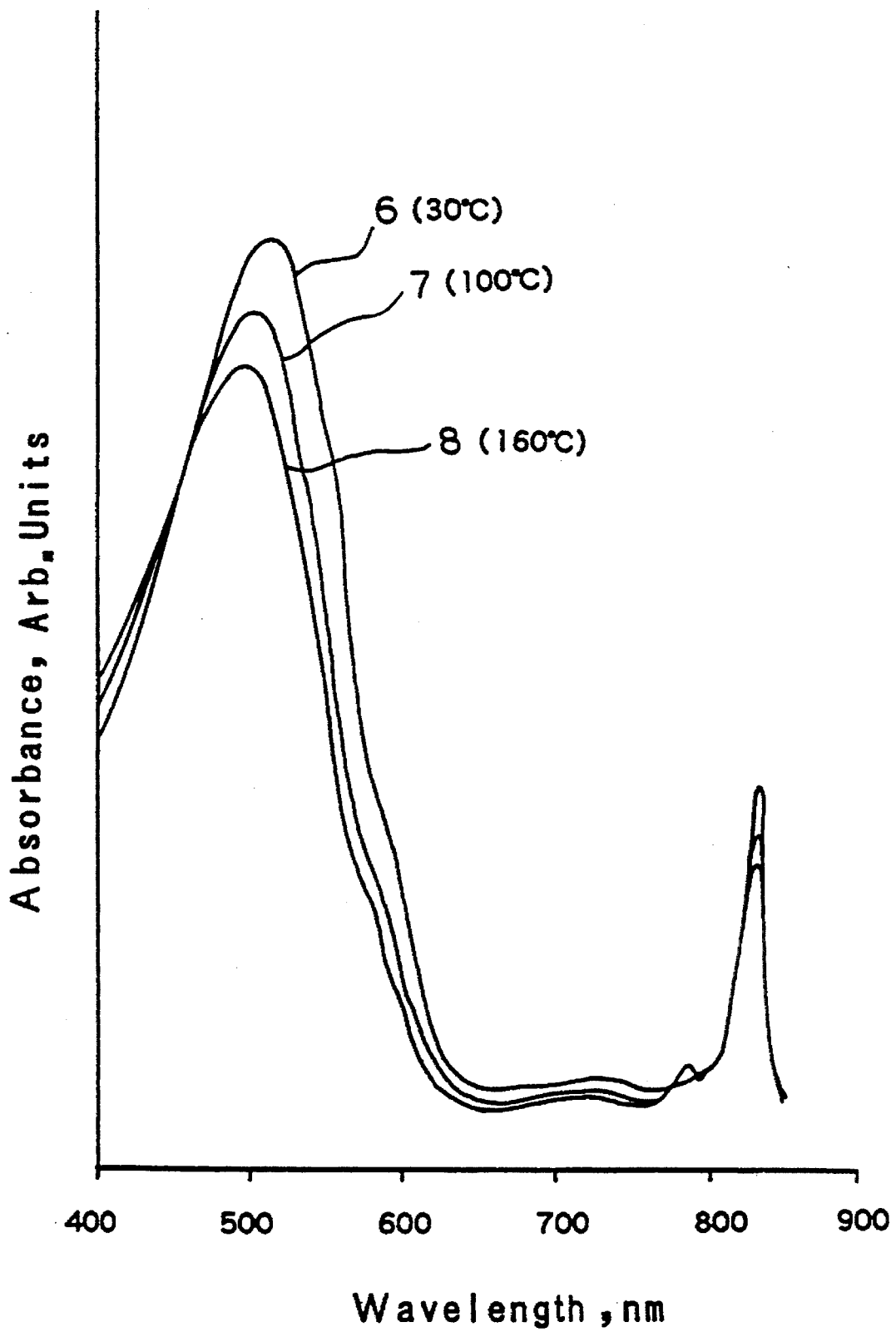
FIGS. 3 and 4 are visible absorption spectra of a function resin composition obtained in Referential Example 2.

The procedures of Referential Example 1 were then followed except for the use of poly(3-hexylthiophene) instead of poly(3-dodecylthiophene). The heating temperatures were set at 30° C., 100° C. and 160° C., respectively. Absorption spectra obtained when heated to the respective heating temperatures are shown in FIG. 3. When heated successively to 160° C., 100° C. and 30° C., absorption spectra similar to the above-described ones were obtained. In FIG. 3, Curves 6, 7 and 8 indicate absorption spectra obtained when heated to 30° C., 100° C. and 160° C., respectively.

Figure 4:
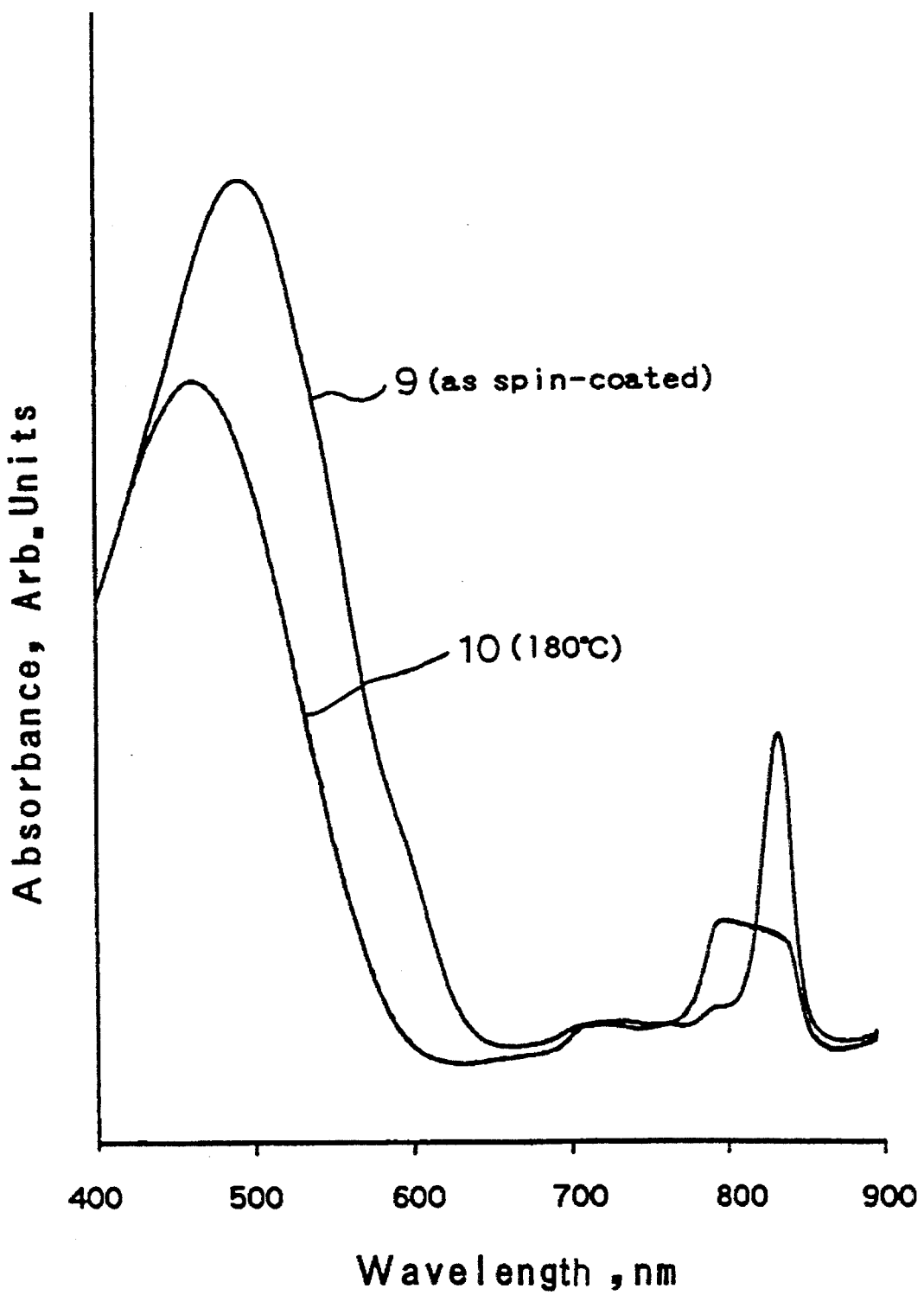

By quenching the film subsequent to its heating as in Referential Example 1, it was possible to fix and retain the changes in the absorption spectrum, said change having taken place during the heating. The results are shown in FIG. 4, in which Curve 9 indicates an absorption spectrum of the film as formed and Curve 10 shows an absorption spectrum of the film when quenched in ice water (1°±1° C.) after being heated at 180° C. for 1 minute.

Referential Example 3

Figure 5:
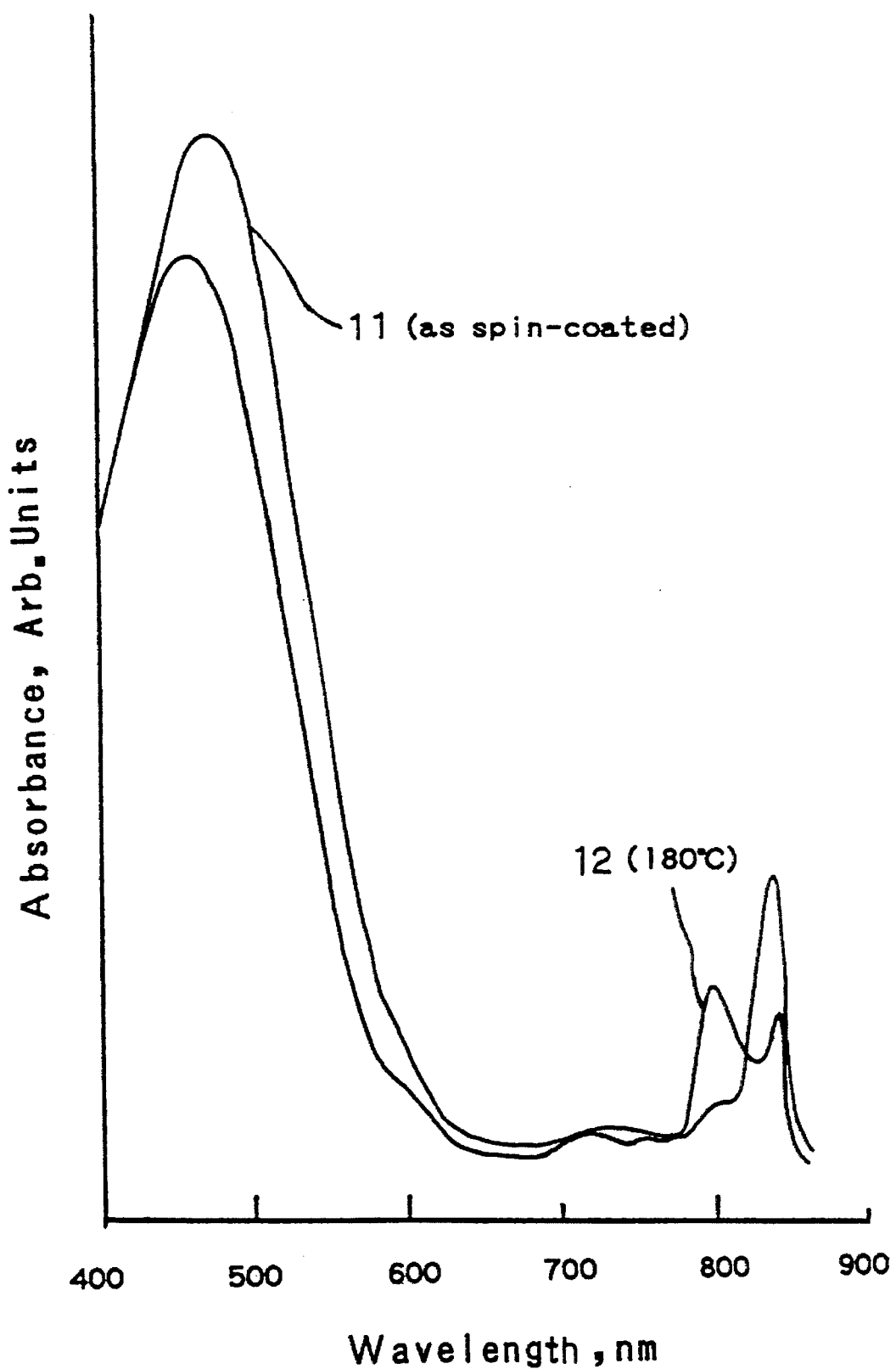
FIG. 5 is a visible absorption spectrum of a function resin composition obtained in Referential Example 3.

3-Butylthiophene was synthesized in a similar manner to Referential Example 1 except for the use of butylmagnesium bromide in lieu of dodecylmagnesium bromide. Following the procedure of Referential Example 1, poly(3-butylthiophene) was then produced in a similar manner to Referential Example 1 except for the use of 3-butylthiophene in place of 3-dodecylthiophene. Poly(3-butylthiophene) (100 parts), 10 parts of bis(triethylsiloxy) silicon-tetrakis(decylthio)naphthalocyanine and 5,000 parts of toluene were then mixed into a liquid formulation. A glass substrate was spincoated with the liquid formulation, whereby a thin film (thickness: 900 Å) was formed. The film so formed was heated and then quenched as in Referential Example 1, whereby changes occurred in an absorption spectrum during the heating were successfully fixed and retained. The results are shown in FIG. 5, in which Curve 11 indicates an absorption spectrum of the film as formed and Curve 12 shows an absorption spectrum of the film when quenched in ice water after being heated at 180° C. for 1 minute.

Referential Example 4

(Performance of function resin composition)

Figure 6:
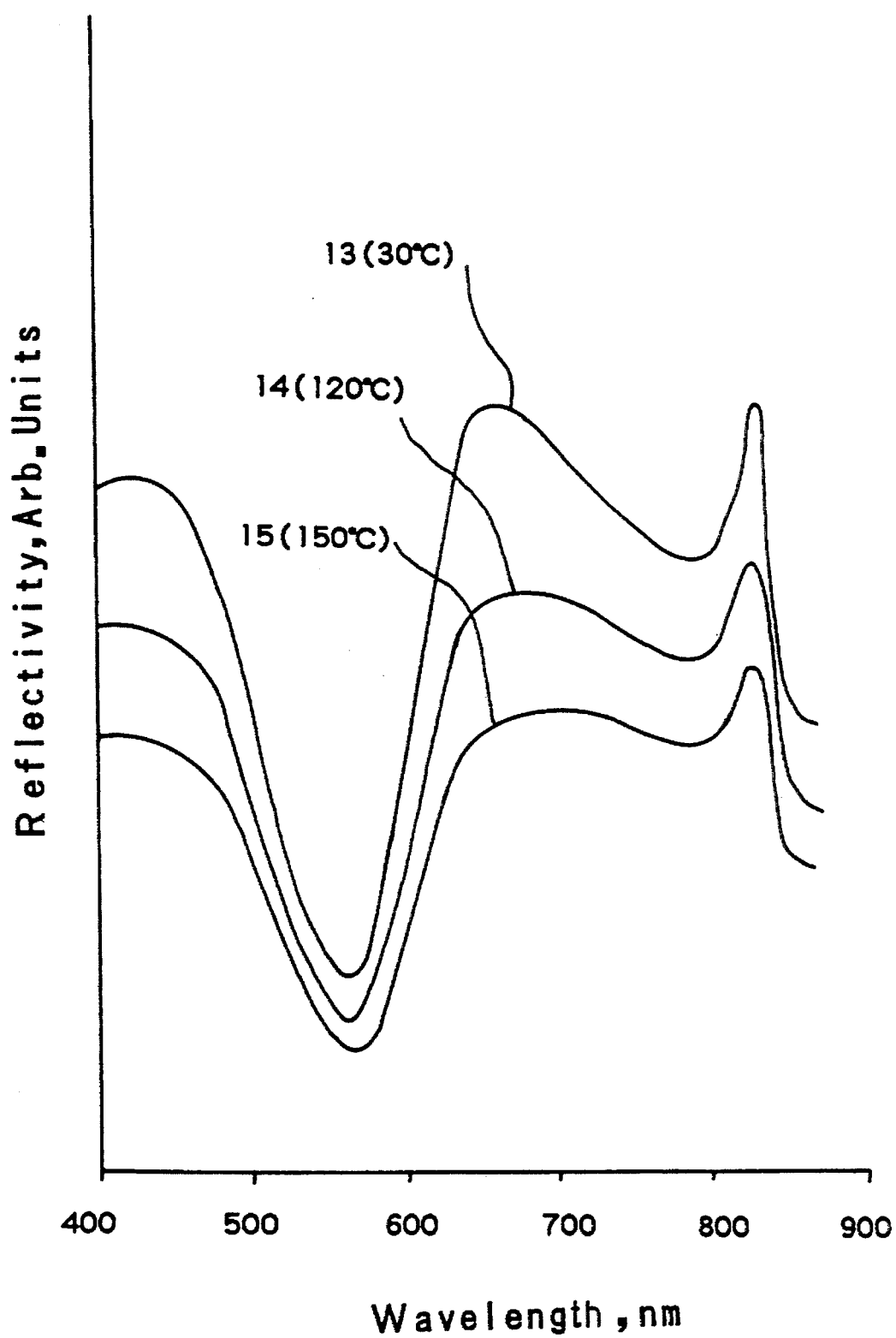
FIG. 6 is a reflection spectrum of a function resin composition obtained in Referential Example 4.

A thin film of a function resin composition was formed on a substrate as in Referential Example 1 except that a substrate with an Si film sputtered to a thickness of 60 nm on a glass disc was used as the substrate and poly(3-hexylthiophene) was employed instead of poly(3-dodecylthiophene). To investigate any relationship between a reflection spectrum of the thus-formed film and its temperature, the film was successively heated to 30° C., 120° C. and 150° C., for 8 minutes at each temperature. In the heated states, its reflection spectra were measured over 400 nm to 900 nm by a spectrophotometer ("U-3400", trade name; manufactured by Hitachi, Ltd.), respectively, while using a vacuum-evaporated aluminum film as a reference. The results are shown in FIG. 6, in which Curve 13 indicates the reflection spectrum when heated at 30° C., Curve 14 the reflection spectrum when heated at 120° C., and Curve 15 the reflection spectrum when heated at 150° C. As is evident from the reflection spectra of FIG. 6, it has been confirmed that the reflection spectrum varies depending on the heating temperature. The film was then heated successively to 150° C., 120° C. and 30° C., at each of which the reflection spectrum of the film was measured as described above. At each of the temperatures, the film showed a reflection spectrum similar to the above-described spectrum.

EXAMPLE 1

Employed as a substrate was a polycarbonate substrate having a thickness of 1.2 mm, an outer diameter of 120 mm and an inner diameter of 15 mm and defining a spiral pre-groove of 0.8 μm in width and 1.6 μm in pitch. A thin Si film was deposited by sputtering to a thickness of 60 nm on the substrate, whereby a substrate reflective layer was formed. The substrate with the substrate reflective layer formed thereon will hereinafter be called "the substrate of Example 1". A liquid formulation—which had been prepared by mixing 10 parts by weight (hereinafter simply referred to as "parts") of poly(3-dodecylthiophene), 1 part of bis(triethylsiloxy)silicon-tetrakis(decylthio)naphthalocyanine and 500 parts of toluene—was spin-coated over the substrate reflective layer so that a recording layer (thickness: 900 Å) was formed. Recording characteristics of the optical disc so obtained were tested by an optical disc evaluation instrument ("OMS-2000", trade name; manufactured by NAKAMICHI CORP.). Namely, using a semiconductor laser of 830 nm in wavelength, recording was conducted on the optical disc at 3 m/sec linear velocity, 8 mW laser power and 1 MHz frequency. The CN value upon read-out (laser power: 0.5 mW) was 45 dB. When a track with a recorded area contained therein was scanned by continuous light of 2 mW laser power, the CN value upon read-out (laser power: 0.5 mW) dropped to 15 dB so that the record was successfully erased. Even after those recording and erasure were repeated 100 times, similar results were obtained. Incidentally, the illumination of the laser beam was all performed from the side of the substrate. This applies equally to the subsequent examples.

EXAMPLE 2

A liquid formulation—which had been prepared by mixing 10 parts of poly(3-hexylthiophene), 1 part of bis(tributylsiloxy)silicon-tetrakis(decylthio)naphthalocyanine and 500 parts of toluene—was spin-coated on the substrate of Example 1, whereby a recording layer (thickness: 900 Å) was formed. The optical disc so obtained was evaluated as in Example 1. As a result, the CN value upon read-out after recording was found to be 45 dB. When a track with a recorded area contained therein was scanned by continuous light of 2 mW laser power, the CN value upon read-out dropped to 15 dB so that the record was successfully erased. Even after those recording and erasure were repeated 100 times, similar results were obtained.

EXAMPLE 3

Employed as a substrate was a glass substrate having a thickness of 1.2 mm, an outer diameter of 120 mm and an inner diameter of 15 mm and defining a spiral pre-groove of 0.8 μm in width and 1.6 μm in pitch. A thin Si film was deposited by sputtering to a thickness of 60 nm on the substrate, whereby a substrate reflective layer was formed. The substrate with the substrate reflective layer formed thereon will hereinafter be called "the substrate of Example 3". A liquid formulation—which had been prepared by mixing 10 parts of poly(3-butythiophene), 1 part of bis(triethylsiloxy)silicon-tetrakis(decylthio)naphthalocyanine and 500 parts of toluene—was spin-coated over the substrate reflective layer so that a recording layer (thickness: 900 Å) was formed. Recording characteristics of the optical disc so obtained were tested by an optical disc evaluation instrument ("OMS-2000", trade name; manufactured by NAKAMICHI CORP.). Namely, using a semiconductor laser of 830 nm in wavelength, recording was conducted on the optical disc at 1.25 m/sec linear velocity, 8 mW laser power and 309 KHz frequency. The CN value upon read-out (laser power: 1 mW) was 47 dB. The optical disc was then heated at 100° C. for 5 minutes in an oven. The heated optical disc was thereafter taken out of the oven and was left over at room temperature, whereby the optical disc was gradually cooled to room temperature. The CN value upon read-out (laser power: 1 mW) dropped to 17 dB so that the information so recorded was successfully erased. When the optical disc was recorded under the same conditions as described above, the CN value upon read-out (laser power: 1 mW) was 47 dB so that the optical disc was rewritable.

EXAMPLE 4

A thin Si film was deposited by sputtering to a thickness of 60 nm on the substrate, whereby a substrate reflective layer was formed. A liquid formulation— which had been prepared by mixing 15 parts of poly(3-hexylthiophene), 1.5 parts of bis(tri-n-hexylsiloxy)silicon-naphthalocyanine and 500 parts of toluene—was spin-coated over the substrate reflective layer so that a recording layer (thickness: 1,300 Å) was formed. Recording characteristics of the optical disc so obtained were tested by an optical disc evaluation instrument ("OMS-2000" trade name; manufactured by NAKAMICHI CORP.). Namely, using a semiconductor laser of 780 nm in wavelength, recording was conducted on the optical disc at 1.25 m/sec linear velocity, 8 mW laser power and 309 KHz frequency. The CN value upon read-out (laser power: 1 mW) was 47 dB. The optical disc was then heated at 100°

C. for 5 minutes in an oven. The heated optical disc was thereafter taken out of the oven and was left over at room temperature, whereby the optical disc was gradually cooled to room temperature. The CN value upon read-out (laser power: 1 mW) dropped to 18 dB so that the information so recorded was successfully erased. When the optical disc was recorded under the same conditions as described above, the CN value upon read-out (laser power: 1 mW) was 43 dB so that the optical disc was rewritable.

EXAMPLE 5

Employed as a substrate was a polycarbonate substrate having a thickness of 1.2 mm, an outer diameter of 120 mm and an inner diameter of 15 mm and defining a spiral pre-groove of 0.8 μm in width and 1.6 μm in pitch. A liquid formulation—which had been prepared by mixing 10 parts poly(3-butylthiophene), 1 part of bis(triethylsiloxy)silicon-tetrakis(decylthio)naphthalocyanine and 920 parts of carbon tetrachloride— was spin-coated on the substrate so that a recording layer (thickness: 1,200 Å) was formed. A thin Cu film of 100 nm in thickness was then deposited by sputtering over the recording layer, whereby a reflective layer was formed. The reflectivity of the thus-obtained optical disc at 780 nm wavelength (when a laser beam entered from the side of the substrate) was 70%. Recording characteristics of the optical disc were tested by an optical disc evaluation instrument ("OMS-2000", trade name; manufactured by NAKAMICHI CORP.). Namely, using a semiconductor laser of 780 nm in wavelength, recording was conducted on the optical disc at 1.25 m/sec linear velocity, 8 mW laser power and 309 kHz frequency. The CN value upon read-out (laser power: 0.5 mW) was 45 dB. The optical disc was then heated at 100° C. for 5 minutes in an oven. The heated optical disc was thereafter taken out of the oven and was left over at room temperature, whereby the optical disc was gradually cooled to room temperature. The CN value upon read-out (laser power: 0.5 mW) dropped to 18 dB so that the information so recorded was successfully erased. When the optical disc was recorded under the same conditions as described above, the CN value upon read-out (laser power: 0.5 mW) was 45 dB so that the optical disc was rewritable.

EXAMPLE 6

Employed as a substrate was a polycarbonate substrate having a thickness of 1.2 mm, an outer diameter of 120 mm and an inner diameter of 15 mm and defining a spiral pre-groove of 0.8 μm in width and 1.6 μm in pitch. A thin $SiO_2$ film was deposited by sputtering to a thickness of 60 nm on the substrate. The substrate with the thin $SiO_2$ film formed thereon will hereinafter be called "the substrate of Example 6". A liquid formulation—which had been prepared by mixing 4.5 parts of poly(3-butylthiophene), 0.45 part of bis(triethylsiloxy)silicon-tetrakis(decylthio)naphthalocyanine and 100 parts of toluene—was spin-coated over the thin $SiO_2$ film so that a recording layer (thickness: 3,600 Å) was formed. A thin Cu film having a thickness of 100 nm was then deposited by sputtering over the recording layer, whereby a reflective layer was formed. The reflectivity of the thus-obtained optical disc at 780 nm wavelength (when a laser beam entered from the side of the substrate) was 67%. Recording characteristics of the optical disc were tested by an optical disc evaluation instrument ("OMS-2000" trade name; manufactured by NAKAMICHI CORP.). Namely, using a semiconductor laser of 780 nm in wavelength, recording was conducted on the optical disc at 1.4 m/sec linear velocity, 8 mW laser power and 309 kHz frequency. The CN value upon read-out (laser power: 0.5 mW) was 50 dB. The optical disc was then heated at 100° C. for 5 minutes in an oven. The heated optical disc was thereafter taken out of the oven and was left over at room temperature, whereby the optical disc was gradually cooled to room temperature. The CN value upon read-out (laser power: 0.5 mW) dropped to 18 dB so that the information so recorded was successfully erased. When the optical disc was recorded under the same conditions as described above, the CN value upon read-out (laser power: 0.5 mW) was 50 dB so that the optical disc was rewritable. When the optical disc was recorded with EFM signals at 1.4 m/sec linear velocity and 8 mW recording power and read-out of the EFM signals was attempted by a commercial CD player, the read-out was found to be feasible.

EXAMPLE 7

A liquid formulation—which had been prepared by mixing 4.7 parts of poly(3-hexylthiophene), 0.47 part of bis(triethylsiloxy) silicon-tetrakis(decylthio)naphthalocyanine and 100 parts of toluene—was spin-coated on the substrate of Example 6 so that a recording layer (thickness: 3,700 Å) was formed. A thin Au film having a thickness of 100 nm was then deposited by sputtering over the recording layer, whereby a reflective layer was formed. The reflectivity of the thus obtained optical disc at 780 nm wavelength (when a laser beam entered from the side of the substrate) was 66%. Recording characteristics of the optical disc were tested by an optical disc evaluation instrument ("OMS-2000", trade name; manufactured by NAKAMICHI CORP.). Namely, using a semiconductor laser of 780 nm in wavelength, recording was conducted on the optical disc at 1.4 m/sec linear velocity, 8 mW laser power and 309 kHz frequency. The CN value upon read-out (laser power: 0.5 mW) was 50 dB. The optical disc was then heated at 100° C. for 5 minutes in an oven. The heated optical disc was thereafter taken out of the oven and was left over at room temperature, whereby the optical disc was gradually cooled to room temperature. The CN value upon read-out (laser power: 0.5 mW) dropped to 18 dB so that the information so recorded was successfully erased. When the optical disc was recorded under the same conditions as described above, the CN value upon read-out (laser power: 0.5 mW) was 50 dB so that the optical disc was rewritable. When the optical disc was recorded with EFM signals at 1.4 m/sec linear velocity and 7 mW recording power and read-out of the EFM signals was attempted by a commercial CD player, the read-out was found to be feasible.

Referential Example 5

(performance of a recording layer according to this invention)

A liquid formulation—which had been prepared by dissolving 10 parts of a block copolymer of trans-1,4-polybutadiene and polystyrene ("ASMER", trade mark; product of ASAHI CHEMICAL INDUSTRY CO., LTD.) and 1 part of bis(triethylsiloxy)silicon-terakis(decylthio)naphthalocyanine in 320 parts of toluene, was spin-coated as a film on a glass substrate on a surface of which a thin silicon film of about 50 nm in thickness had been formed by sputtering. To investigate variations in the optical characteristics of the thus-formed film upon heating, the reflection spectrum (relative to Al) of the film was measured after the film had been quenched in ice water (1°±1° C.) subsequent to its heating at 180° C. for 1 minute (equivalent to recording) and also after the thus-quenched film had been heated again at 100°

Figure 7:
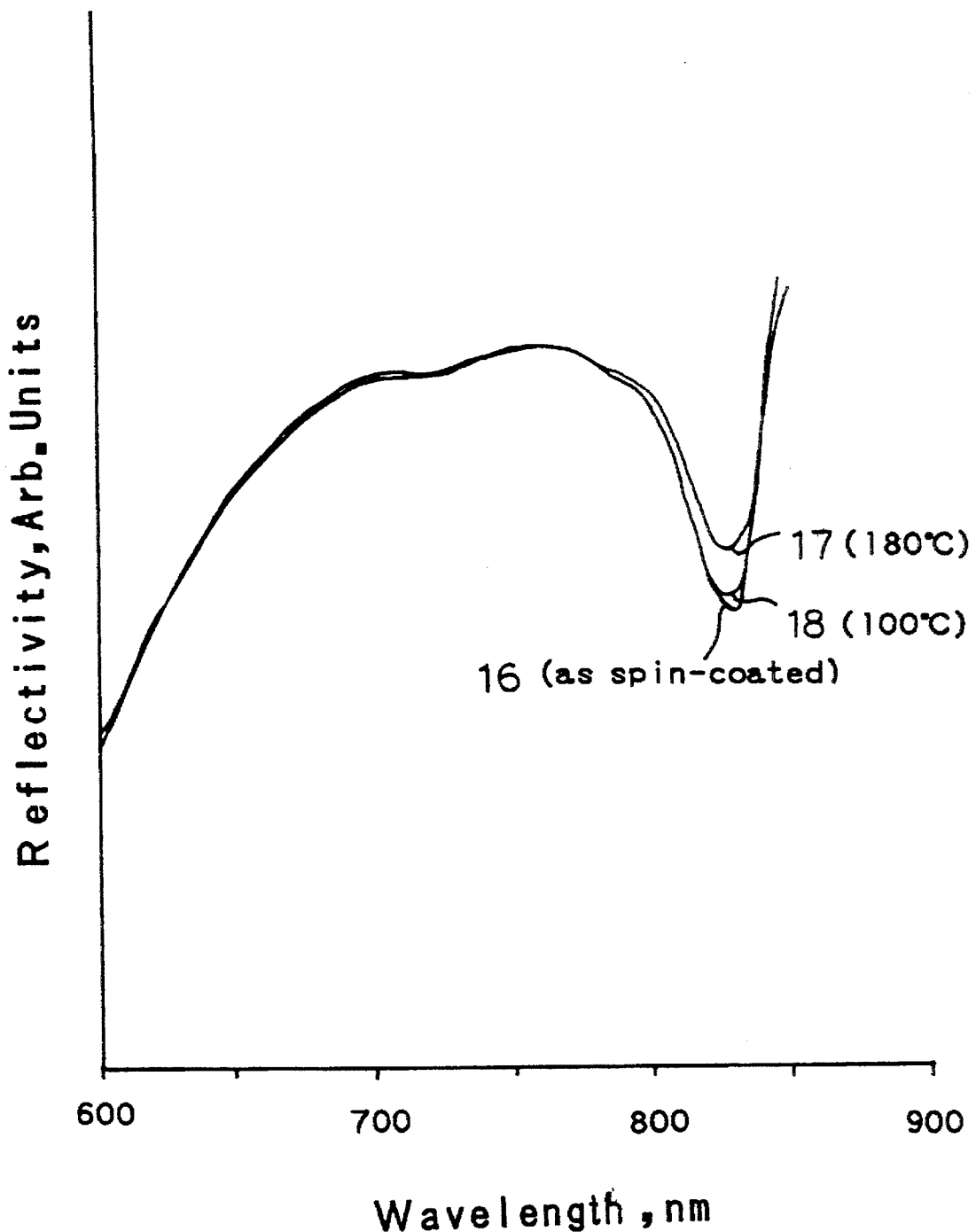
FIG. 7 is a reflection spectrum of a function resin composition obtained in Referential Example 5.

C. for 1 minute and then quenched in ice water (1°±1° C.) (equivalent to erasing). The results are shown in FIG. 7, in which Curve 16 indicates the reflection spectrum before the heating, Curve 17 the reflection spectrum when heated to 180° C. and Curve 18 the reflection spectrum when heated to 100° C. As is apparent from FIG. 7, the reflection spectrum reversibly changed by adjusting the degree of heating (the temperature).

EXAMPLE 8

A thin silicon film of about 50 nm in thickness (refractive index at 830 nm: 3.5, extinction coefficient: 0.01) was formed by sputtering on a grooved disc substrate having a diameter of 120 mm and made of a polycarbonate [product of Idemitsu Petrochemical Co., Ltd., refractive index at 830 nm: 1.59), whereby a reflective layer was formed. A liquid formulation— which had been prepared by uniformly dissolving 10 parts of a block copolymer of trans-1,4-polybutadiene and polystyrene ["ASMER", trade mark; product of ASAHI CHEMICAL INDUSTRY CO., LTD.) and 1 part of bis(triethylsiloxy)silicon-tetrakis(decylthio)naphthalocyanine in 320 parts of toluene—was next spin-coated as a film on a surface of the silicon film of the substrate to form a recording layer of about 290 nm in thickness, whereby an optical recording medium was produced.

Recording characteristics and erasure characteristics of the above-produced optical recording medium were measured by illuminating a 1 mW laser beam onto the optical recording medium under tracking serbo-control by means of an optical recording characteristic evaluation instrument equipped with a semiconductor laser whose wavelength was 830 nm ("OMS2000", trade name; manufactured by NAKAMICHI CORP.; this instrument is designed to illuminate a laser beam from the side of the substrate). Recording was conducted at 3 m/sec rotation speed, 1 MHz frequency and 50% duty while changing the laser power. The CN value indicated dependency on the recording power and, at 5 mW laser power, the CN value was found to be 45 dB. Erasure was next effected by illuminating the recorded track in its entirety with a 2 mW laser beam while rotating the optical recording medium at a linear velocity of 3 m/sec. The CN value dropped and the erasure ratio was found to be 25 dB. Further, the erased track was recorded again at the same 5 mW power as the power employed in the recording. The CN value was found to be 45 dB, which was the same as that obtained in the recording. Such variations in the CN value upon recording, erasure and re-recording were observed repeatedly, whereby the above-produced optical recording medium was found to be rewritable.

Using an optical recording material evaluation instrument ["ODS-411XA", trade name; manufactured by K.K. Matsui Manufacturing Ltd.], a laser beam of 830 nm wavelength and 8 mW power was illuminated for 0.5 μsec onto the above-obtained optical recording medium from the side of the substrate. The illuminated area was observed by an optical microscope (magnification:× 1000). Changes in profile, such as pits or bumps, were not observed.

EXAMPLE 9

One part of a cyanine dye (1,1'-dibutyl-3,3,3', 3'-tetramethyl-2,2'-(4,5,4',5'-dibenzo) indodicarbocyanine perchlorate) having a refractive index 2.3 and an extinction coefficient of 0 at 830 nm wavelength was dissolved in 124 parts of 2,2,3,3-tetrafluoro-1-propanol. The solution so prepared was coated as a film by spin coating on a grooved disc substrate having a diameter of 120 mm and made of a polycarbonate (product of Idemitsu Petrochemical Co., Ltd.), whereby a substrate reflective layer of about 65 nm in thickness was formed. Then, 10 parts of a photosetting silicone resin ["TUV 6000", trade name; product of Toshiba Silicone Co., Ltd.] were dissolved in 51 parts of n-octane. The resultant solution was spin-coated as a film on the substrate with the reflective layer formed thereon. Ultraviolet rays are illuminated onto the film so that the film was cured to form a protective layer of about 390 nm in thickness.

Next, 10 parts of the same block copolymer of trans-1, 4-polybutadiene and polystyrene as that employed in Example 8 and 1 part of bis(triethylsiloxy)silicon-tetrakis-(decylthio)naphthalocyanine were dissolved in 320 parts of toluene, whereby a homogeneous solution was prepared. That solution was spin-coated as a film on the protective layer to form a recording layer of about 200 nm in thickness, whereby an optical recording medium was produced.

Recording characteristics and erasure characteristics of the above-produced optical recording medium were measured under the same conditions as in Example 8 by using the same optical recording characteristic evaluation instrument as that employed in Example 8. As a result, the CN value was found to be 40 dB at 6 mW recording power. The CN value dropped at 2 mW erasure power so that an erasure ratio of 20 dB was obtained. Further, at 6 mW re-recording power, the CN value was found to be 40 dB. Such variations in the CN value were observed repeatedly, whereby the above-produced optical recording medium was found to be rewritable.

EXAMPLE 10

A thin silicon film of about 50 nm in thickness (refractive index at 830 nm: 3.5, extinction coefficient: 0.01) was formed by sputtering on a grooved disc substrate having a diameter of 120 mm and made of a polycarbonate [product of Idemitsu Petrochemical Co., Ltd., refractive index at 830 nm: 1.59), whereby a reflective layer was formed. A liquid formulation— which had been prepared by uniformly dissolving 10 parts of atactic polystyrene (molecular weight: 95,800, product of Aldrich Chemical Company) and 1 part of bis(triethylsiloxy)silicon-tetrakis(decylthio)naphthalocyanine in 320 parts of toluene—was next spin-coated as a film on a surface of the silicon film of the substrate to form a recording layer of about 200 nm in thickness, whereby an optical recording medium was produced.

Recording characteristics and erasure characteristics of the above-produced optical recording medium were measured under the same conditions as in Example 8 by using the same optical recording characteristic evaluation instrument as that employed in Example 8.

As a result, the CN value was found to be 40 dB at 4.5 mW recording power. When the optical recording medium was placed in an oven and subjected to heat treatment at 120° C. for 5 minutes, the CN value dropped so that an erasure ratio of 20 dB was obtained. Further, at 4.5 mW re-recording power, the CN value was found to be 40 dB. Such variations in the CN value were observed repeatedly, whereby the above-produced optical recording medium was found to be rewritable.

EXAMPLE 11

A thin $SiO_2$ film of about 50 nm in thickness was formed by sputtering on a grooved disc substrate having a diameter of 120 mm and made of a polycarbonate [product of Idemitsu Petrochemical Co., Ltd.). A liquid formulation— which had been prepared by uniformly dissolving 10 parts of poly(4-t-butylstyrene) and 1 part of bis(triethylsiloxy)silicon-tetrakis(decylthio)naphthalocyanine in 400 parts of toluene—was next spin-coated as a film on a surface of the SiO$_2$ film of the substrate to form a recording layer of about 150 nm in thickness, whereby an optical recording medium was produced. An Au film of about 100 nm in thickness was formed by sputtering over the recording layer, hereby a reflective layer was formed. An ultraviolet-curable resin was spin-coated further as a film over the reflective layer, to which ultraviolet rays are illuminated to cure the resin so that a protective layer of about 5 μm in thickness was formed.

A semiconductor laser beam whose wavelength was 780 nm was illuminated at 1.4 m/sec and 5.5 mW recording power onto the thus-produced optical disc by means of an optical recording characteristic evaluation instrument ("OMS2000", trade name; manufactured by NAKAMICHI CORP.), whereby music signals added with EFM subsequent 10 to A/D conversion were recorded. The optical disc was played by a commercial CD player. The reflectivity was found to be 66% so that the read-out of the music signals was feasible.

Further, an optical disc without any protective layer formed thereon was illuminated by the same laser beam as that used above. An illuminated area was observed by an optical microscope. Changes in profile, such as pits or bumps, were not observed.

What is claimed is:

1. An erasable and rewritable information recording medium having a recording layer wherein said recording layer comprises a composition having:
   (I) at least one conjugated organic polymer whose conformation changes by exposure to thermal energy and
   (II) at least one dye selected from the group consisting of phthalocyanine dyes, tetrapyradinoporphyradine dyes, naphthalocyanine dyes, and nickel dithiol complexes.

2. The recording medium of claim 1, wherein said conjugated polymer contains structural units represented by the following formula (I):

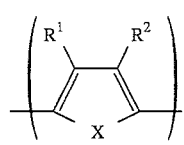

(I)

wherein R$^1$ and R$^2$ are the same or different and each represent a hydrogen atom or a monovalent organic group with the proviso that at least one of R$^1$ and R$^2$ stands for a monovalent organic group, and X denotes S, O, Se or NR$^3$, R$^3$ being a hydrogen atom or an alkyl or aryl group.

3. The information recording medium according to claim 2 wherein X is S, R$^1$ is H, and R$^2$ is an alkyl group having 4–18 carbon 4. The recording medium of claim 1, further comprising:
   a transparent substrate; and
   a substrate reflective layer formed on said transparent substrate and carrying said recording layer formed thereon.

5. The recording medium of claim 1, further comprising:
   a transparent substrate; and
   a substrate-protecting layer formed on said transparent substrate and carrying said recording layer formed thereon.

6. The recording medium of claim 1, further comprising a reflective film formed on said recording layer.

7. The information recording medium according to claim 1, wherein the amount of the dye is 2 to 30 parts by weight based on 100 parts by weight of the conjugated polymer.

8. The information recording medium according to claim 1 wherein the dye is a naphthalocyanine dye.

9. The information recording medium according to claim 1 wherein the dye has the following formula:

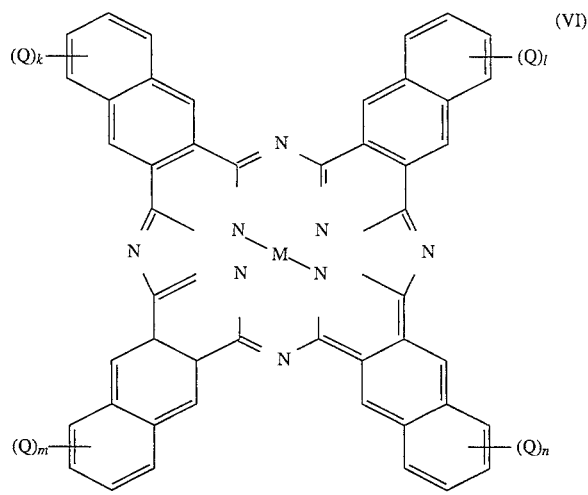

(VI)

wherein M represents any one member selected from the group consisting of two hydrogen atoms, a Group Ib, IIa, IIb, IIIa, IVa, IVb, VIb, VIIb, or VIII metal, an oxide of said metals, a halide of said metals, a hydroxide of said metals or any of said metals having one or more substituent groups, Q denotes a substituent, and k, l, m and n individually stand for 0 or an integer of 1–4.

10. The information recording medium according to claim 9 wherein M represents any one of the following groups:
   —Si—(OSi(R$^3$)$_3$)$_2$
   —Ge—(OSi(R$^3$)$_3$)$_2$
   —Sn—(OSi(R$^3$)$_3$)$_2$
   —Ge—(OSi(OR$^3$)$_3$)$_2$
   —Sn—(OSi(OR$^3$)$_3$)$_2$ wherein R$^3$ is an alkyl group having 1 to 6 carbon atoms and wherein Q represents a substituent group selected from the group consisting of alkyl, alkylthio, alkoxyl, alkoxycarbonyl, alkoxyalkyl, and an amino group substituted by an alkyl group.

11. The information recording medium according to claim 9 wherein M represents —Si—(OSi(R$^3$)$_3$)$_2$ and Q represents —S—R$^4$ wherein R$^3$ is an alkyl group having 1 to 4 carbon atoms and R$^4$ is an alkyl group having 4 to 16 carbon atoms.

12. An optical disc having an erasable and rewritable recording layer wherein said recording layer comprises a composition having:
   (I) at least one conjugated organic polymer whose conformation changes by exposure to thermal energy and
   (II) at least one dye selected from the group consisting of phthalocyanine, dyes, tetrapyradinoporphyradine dyes, naphthalocyanine dyes, and nickel dithiol complexes.

* * * * *